United States Patent Office 3,537,835
Patented Nov. 3, 1970

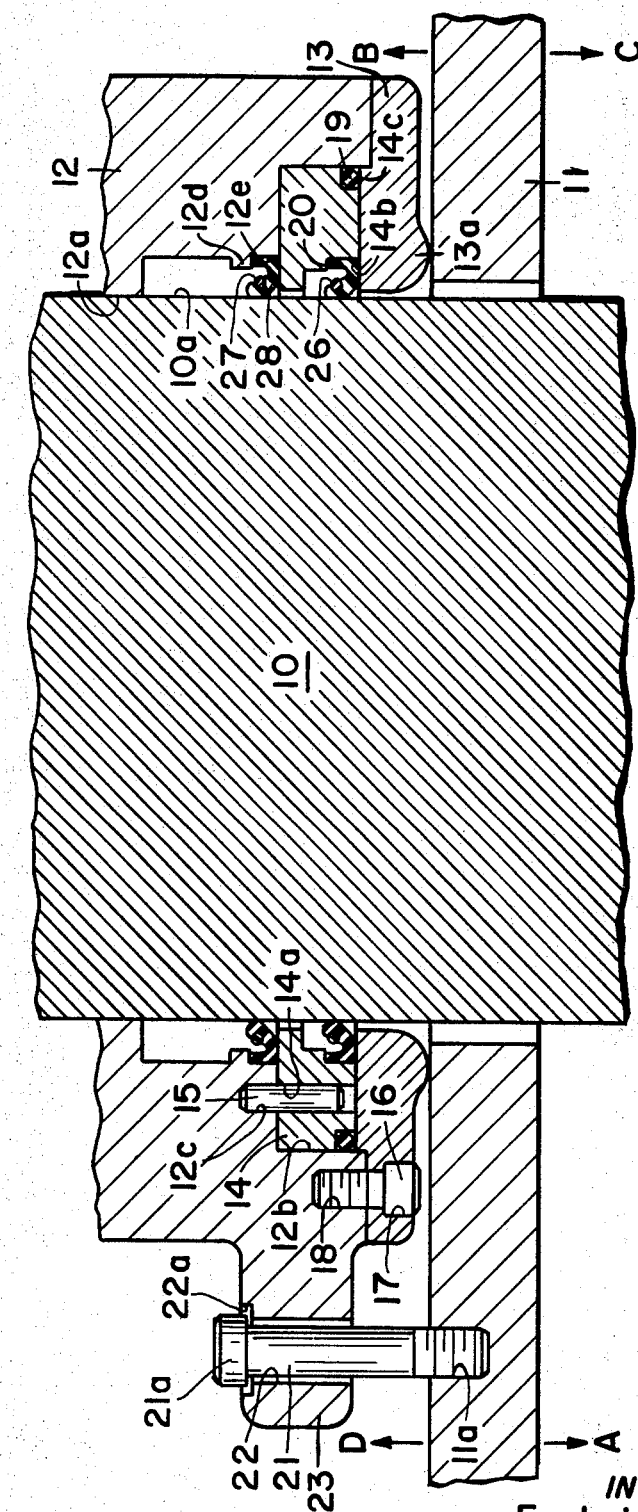

3,537,835
SLEEVE BEARING FOR ROTARY GLASSWARE MOLDING TABLE
Frederick A. Dahlman, Corning, and Willem Dykshoorn, Painted Post, N.Y., assignors to Corning Glass Works, Corning, N.Y., a corporation of New York
Filed May 23, 1968, Ser. No. 731,436
Int. Cl. C03b *11/02*
U.S. Cl. 65—246                                    8 Claims

ABSTRACT OF THE DISCLOSURE

A sleeve member closely or snugly surrounds a circular outer periphery of a vertically and upwardly extending column for rotation thereabout, the lower end of said sleeve member resting on the top surface of a horizontal table surrounding said column in a spaced relationship therefrom for rotation thereabout, said sleeve member having a lower rim of a generally semicircular configuration such that rocking or tilting motion of said table will not be imparted to such sleeve member in a manner such as to cause skew and resultant binding between the inner surface of the sleeve member and the outer periphery of said column, said sleeve member and said table being loosely coupled with each other for rotation thereof in synchronism or coincidence with each other.

BACKGROUND OF THE INVENTION

There are many apparatuses which comprise a vertically and upwardy extending central pillar or column having a round or circular outer periphery, a horizontal table or carrier member surrounding said column for rotation thereabout and a sleeve member closely or snugly surrounding said outer periphery of said column in a rotatable relationship therewith and securely affixed to said table or carrier member for rotation therewith. When such a table or carrier member is stationary or rotates about such a column, such member or table is often rocked or tilted. Such rocking or tilting motion is imparted to the sleeve member which is affixed to the table or carrier member and skew and resultant binding between the inner surface of the sleeve member and the outer periphery of said pillar or column results or tends to occur, thereby causing undue wear of such parts and requiring early replacement thereof, or causing a degree of binding which will prevent rotation of the associated apparatus. This is especially true when the sleeve member and the pillar or column are of a substantial length and such member closely or snugly surrounds the column throughout a large part of such length.

Accordingly, the present invention was conceived and developed to prevent, to the extent possible, the binding which occurs or tends to occur as a result of any rocking or tilting motion of a table or carrier member such as discussed above.

SUMMARY OF THE INVENTION

In practicing the invention disclosed, a sleeve member, which snugly or closely surrounds the outer periphery of a circular pillar or column for rotation thereabout in coincidence or synchronism with a horizontal table or carrier member which also surrounds said pillar or column for rotation thereabout, is provided with a lower rim including a lowermost portion having a diametric cross-section configuration which is substantially convexly semi-circular. Such sleeve member closely or snugly surrounds said pillar or column with the lowermost surface of said lowermost portion of its lower rim contacting or resting on the top surface of said table or carrier member. The sleeve and table or carrier member are then loosely coupled with each other so that they will rotate in coincidence or synchronism but so that any rocking or tilting of the table or carrier member will not be imparted to the sleeve member in a manner such as to cause or tend to cause skew and resulting binding between the inner surface of such member and the outer peripheral surface of said pillar or column.

BRIEF DESCRIPTION OF THE DRAWINGS

The invention will best be understood with reference to the single accompanying drawing which comprises a cross-sectional elevational view illustrating the preferred embodiment of the invention with only the portions of the apparatus essential to the invention being shown.

PREFERRED EMBODIMENT OF THE INVENTION

Referring to the single drawing figure in detail, there is shown a portion of a vertically and upwardly extending central support column or pillar 10, a portion of a horizontal table or carrier member 11 surrounding said column in a spaced relationship therefrom and rotatable thereabout, and a sleeve member 12 which is rotatable about column 10 but whose inner surface 12a snugly or closely surrounds the outer periphery or peripheral surface 10a of such column with only a minimum of clearance between said surfaces to permit said rotation of member 12, such clearance being on the order, for example, of 0.001 inch. An extremely thin film of oil is continuously provided between surfaces 10a and 12a at a series of locations vertically along column 10 and sleeve member 12 for lubrication purposes, as is well known in the art. The means for continuously providing said thin film form, per se, no part of the present invention and, therefore, are not shown in the drawing for purpose of simplification thereof.

The lower end of sleeve member 12 includes or is provided with a bottom or lower rim 13 having a lowermost bearing portion 13a extending below the remainder of such rim. It will be seen from a cross-section of such rim, taken diametrically across the center thereof as shown in the drawing, that said lowermost bearing portion 13a of rim 13 has a generally convexly semicircular configuration. The entire lowermost annular surface of bearing portion 13a normally contacts or rests on the top surface of table or carrier member 11 as will be readily apparent from the drawing.

It is pointed out that rim 13 of sleeve member 12 may be an integrant part of such member but it is preferred to separately form such rim from a relatively hard, durable and wear-resistant material and to attach the rim to the bottom of sleeve member 12 as by a plurality of socket headed bolts such as 16 disposed in recessed holes such as 17 provided in the rim, and extending therethrough and into cooperatively threaded holes such as 18 embodied in the bottom of sleeve member 12.

For the purpose of rotating table or carrier member 11 and sleeve member 12 substantially in coincidence or synchronism with each other, means are provided for loosely coupling such table and sleeve member to each other. As shown in FIG. 1, such means comprises a vertically and upwardly extending bolt 21 which also extends through a passage 22 embodied in an extending ear or lug 23 provided on the outer periphery of sleeve member 12. Passage 22 has a diameter slightly greater than the diameter of bolt 21 and the bottom threaded end of the bolt is screwed a selected distance into a cooperatively threaded hole 11a provided in the top surface of table 11, such distance being selected so that a selected amount of clearance remains between the surfaces defining the limits of a recessed top portion 22a of passage 22 in lug 23 and the peripheral and bottom surfaces of head 21a of bolt 21, such bolt head being partially disposed in said recessed portion 22a of passage 22 as illustrated. The purpose of the providing clearances will become apparent hereinafter in the description. Other means for providing the desired loose coupling between said table 11 and sleeve 12 will be readily apparent to those skilled in the art and it is not intended that the specific coupling means illustrated be considered a critical part of the invention.

If rim 13 is separately formed and attached to sleeve member 12 as previously mentioned, the inner surface of such sleeve member is preferably recessed adjacent the lower end thereof to provide an inner annular recess or passage 12b which extends around the entire sleeve member. An annular member 14 is disposed in recess 12b and is connected to sleeve member 12, for driven rotation therewith, by a dowel pin 15 disposed in cooperatively aligned holes 12c and 14a provided in members 12 and 14, respectively. The inner and outer surfaces of annular member 14 are recessed at the bottom of such member, to provide recesses 14b and 14c, respectively. An oil seal comprising a rubber O-ring 19 is disposed in recess 14c and there is positioned in recess 14b another rubber oil seal 20 which is held in position by an annular spring backing member 26. Above annular member 14 there is provided on the inner surface of sleeve member 12 an annular inwardly extending portion 12d which provides a recess 12e, similar to recess 14b in member 14. A third rubber oil seal 27, similar to seal 20, is disposed in recess 12e and is held in position by an annular spring backing member 28 similar to backing member 26. Any lubricating oil leaking from between the adjacent portions of surfaces 10a and 12a of column 10 and sleeve member 12, respectively, will be prevented from reaching rim 13 of sleeve member 12 by oil seals 27, 20 and 19, the latter two seals being merely back-up seals for seal 27. The arrangement just described, and including member 14 and said oil seals, are not essential to the invention but do prevent, to the extent possible, the above-mentioned leaking oil from reaching the bottom surface of portion 13a of rim 13 and the top surface of table or carrier member 11 over which it can flow to provide an undesirable accumulation of oil on such surface.

It is pointed out that table or mold carrier 11 and column or pillar 10 may, for example, be the central support column, and mold carrier or mold table, respectively, of a glass pressing apparatus, such mold or table carrying adjacent its outer periphery a plurality of female glass pressing molds which are cooperative with an overlying male plunger or plungers for the press forming of glass articles from charges of molten glass supplied to said molds. However, the invention is not intended to be confined to use with a glass pressing apparatus but may be employed in any suitable apparatus, of the type such as described, for the purpose of preventing rocking or tilting motion to be imparted to a sleeve member, closely surrounding and rotatable about an upright column or pillar member, in such a manner that such rocking or tilting motion will cause skew between such members, and undesirable resultant binding between and undue wear of such members.

As a first example of the utility or purpose of the invention, it will be assumed that the lefthand side of table 11, viewing the drawing, is caused to rock or be tilted downwardly as indicated by the arrow above the letter A in the drawing. At such time the top surface of table 11 will be separated from contact with the curved lower surface of bearing portion 13a at and adjacent the lefthand portion (viewing the drawing) of such lower surface, and the top surface of table 11 will revolve about the outer portion of the curved lower surface of bearing portion 13a at and adjacent the righthand portion (viewing the drawing) of such lower surface. Sleeve member 12 may, of course, be slightly raised upwardly along the length of column 10 at such time but not to any appreciable extent, if any.

It is apparent that if the righthand side of table 11, viewing the drawing, is caused to rock or be tilted upwardly as indicated by the arrow below the letter B in FIG. 1, movement of the top surface of table 11 and of sleeve member 12, similar to that just described, will result.

Assuming now that the righthand side of table 11 (viewing the drawing) is caused to rock or be tilted downwtrdly as indicated by the arrow above the letter C, movements opposite to that described above will result. That is, the top surface of table 11 will separate from its contact with the lower surface of bearing portion 13a at and adjacent said righthand portion of such lower surface while the top surface of table 11 will revolve about the outer portion of the curved lower surface of bearing portion 13a at and adjacent said lefthand portion of such lower surface. It will thus be apparent, in the light of the two foregoing examples, that any rocking or tilting motion or motions of table 11 will not be imparted to sleeve member 12 in such a manner as to cause skew between the inner surface of such member and the outer peripheral surface of column 10. Binding and resultant undue wear between and of said surfaces of sleeve member 12 and column 10, which may otherwise be caused by rocking or tilting motion of table 11, are thereby prevented. It is also apparent that if the lefthand side of table 11, viewing the drawing, is caused to rock or be tilted upwardly as indicated by the arrow below the letter D, movement of the top surface of table 11 and of sleeve member 12, similar to that just described, will result.

It is pointed out that the inventive sleeve bearing disclosed operates to prevent the aforesaid skew, binding and undue wear whether rocking or tilting motion of table 11 occurs when the apparatus is otherwise at rest, or when table 11 and sleeve member 12 are rotating about column 10. If, as previously discussed, table 11 and column 10 are parts of a glass pressing apparatus or machine, rocking or tilting motion of table 11 can occur, when such table is otherwise at rest, as a result of a pressing plunger press-forming a charge of molten glass in a female glass pressing mold carried by said table as previously mentioned. Rocking may also occur during rotation of the table due to clearances required in the bearing surfaces.

Although there is herein shown and described only a single embodiment of the apparatus of the present invention, it will be understood that various changes and modifications may be made therein within the scope of the appended claims without departing from the spirit and purview thereof.

What is claimed is:

1. In combination with a vertically and upwardly extending column member having a round or circular outer periphery and a table surrounding such column member for rotation thereabout:
   (a) a sleeve member snugly and also rotatably surrounding said column member for rotation thereabout, such sleeve member being provided with a bottom rim including a bearing portion extending below the remainder of such rim and having a generally semicircular convex diametric cross-sectional configuration, the lowermost annular surface of such bearing portion resting on the top surface of said table; and
   (b) means loosely coupling said sleeve member with said table for rotatively driving such sleeve in coincidence with the rotation of said table.

2. Apparatus in accordance with claim 1 and in which said table is a mold carrier of a glass pressing machine.

3. Apparatus in accordance with claim 1 and in which said coupling means comprises a vertical bolt affixed to said table and extending through a hole provided in a lug on the outer periphery of said sleeve member, such slot having a diameter somewhat larger than the diameter of said bolt.

4. Apparatus in accordance with claim 2 and in which said coupling means comprises a vertical bolt affixed to said table and extending through a hole provided in a lug on the outer periphery of said sleeve member, such slot having a diameter somewhat larger than the diameter of said bolt.

5. In a glass forming apparatus comprising a vertically and upwardly extending central column having a horizontal cross-section of a round or circular configuration, and a generally horizontal mold carrier member surrounding said column for rotation thereabout, the combination comprising:
  (a) a sleeve member snugly surrounding said column for rotation thereabout, such sleeve member having a lower rim including a bearing portion extending below the remainder of the rim and having a diametric cross-section of a generally semicircular convex configuration, the lowermost annular surface of said bearing portion contacting the top surface of said mold carrier member; and
  (b) means loosely coupling said members to each other for rotation of such members in synchronism.

6. Apparatus in accordance with claim 5 and in which said mold carrier carries adjacent its outer periphery a plurality of molds for press-forming glass articles.

7. Apparatus in accordance with claim 5 and in which said coupling means comprises a vertical bolt affixed to one of said members and extending loosely into a hole embodied in the other of said members.

8. Apparatus in accordance with claim 6 and in which said coupling means comprises a vertical bolt affixed to one of said members and extending loosely into a hole embodied in the other of said members.

References Cited

UNITED STATES PATENTS

| 1,839,844 | 1/1932 | Granger | 64—4 |
| 2,143,696 | 1/1939 | Holmes et al. | 65—251 |
| 3,476,447 | 11/1969 | Boyd | 308—72 X |

ARTHUR D. KELLOGG, Primary Examiner

U.S. Cl X.R.

65—264, 308; 64—6, 10; 308—40